(12) United States Patent
Weeden

(10) Patent No.: US 8,783,211 B1
(45) Date of Patent: Jul. 22, 2014

(54) VENTILATED PET BED

(76) Inventor: Greg T. Weeden, Baden (CA)

( * ) Notice: Subject to any disclaimer, the term of this patent is extended or adjusted under 35 U.S.C. 154(b) by 281 days.

(21) Appl. No.: 13/285,288

(22) Filed: Oct. 31, 2011

(51) Int. Cl.
*A01K 1/035* (2006.01)

(52) U.S. Cl.
USPC ........................................... 119/28.5

(58) Field of Classification Search
CPC .... A01K 1/035; A01K 1/0353; A01K 1/0064
USPC ........................................... 119/28.5
See application file for complete search history.

(56) References Cited

U.S. PATENT DOCUMENTS

| | | | |
|---|---|---|---|
| D124,557 S | 1/1941 | Richardson | |
| 2,292,540 A * | 8/1942 | Norton | 119/28.5 |
| 5,044,325 A | 9/1991 | Miksitz | |
| 5,072,694 A | 12/1991 | Haynes et al. | |
| 5,311,837 A * | 5/1994 | Mamer-Boellstorff | 119/28.5 |
| D369,443 S | 4/1996 | Givens | |
| D400,313 S | 10/1998 | Chatwell | |
| 6,084,209 A | 7/2000 | Reusche et al. | |
| 6,237,531 B1 | 5/2001 | Peeples et al. | |
| 6,553,935 B1 * | 4/2003 | Penner | 119/28.5 |
| D533,687 S | 12/2006 | Bull | |
| 7,237,506 B2 * | 7/2007 | Dietz | 119/28.5 |
| 7,673,353 B1 * | 3/2010 | Khodabandeh | 5/423 |
| 7,887,571 B2 * | 2/2011 | Cochenour et al. | 607/96 |
| 8,267,043 B1 * | 9/2012 | Gustafson | 119/28.5 |
| 2005/0279286 A1 * | 12/2005 | Youngmark | 119/28.5 |
| 2008/0127897 A1 | 6/2008 | Flannery | |

FOREIGN PATENT DOCUMENTS

GB 2211387 A * 7/1989 ............. A01K 1/035

* cited by examiner

*Primary Examiner* — Rob Swiatek
*Assistant Examiner* — Ebony Evans
(74) *Attorney, Agent, or Firm* — Robert C. Montgomery; Montgomery Patent & Design

(57) ABSTRACT

A pet bed adapted for use atop a floor mounted air register includes a bed structure and a base structure. The bed structure is an open-topped housing with a pet accessible entrance along a front side to facilitate a pet entering and lying within the bed structure. The base structure is a durable support extending downwardly from a floor surface of the bed structure. The pet bed is placed over the floor-mounted air register in order to allow a portion of air expelled from the air register to enter the open interior area of the bed structure through a plurality of ventilating apertures in the floor to provide temperature regulation to a pet within the bed while allowing the remaining flow of air to exit the pet bed through additional apertures along a front surface of the base structure in order to provide temperature regulation to the surrounding space.

19 Claims, 6 Drawing Sheets

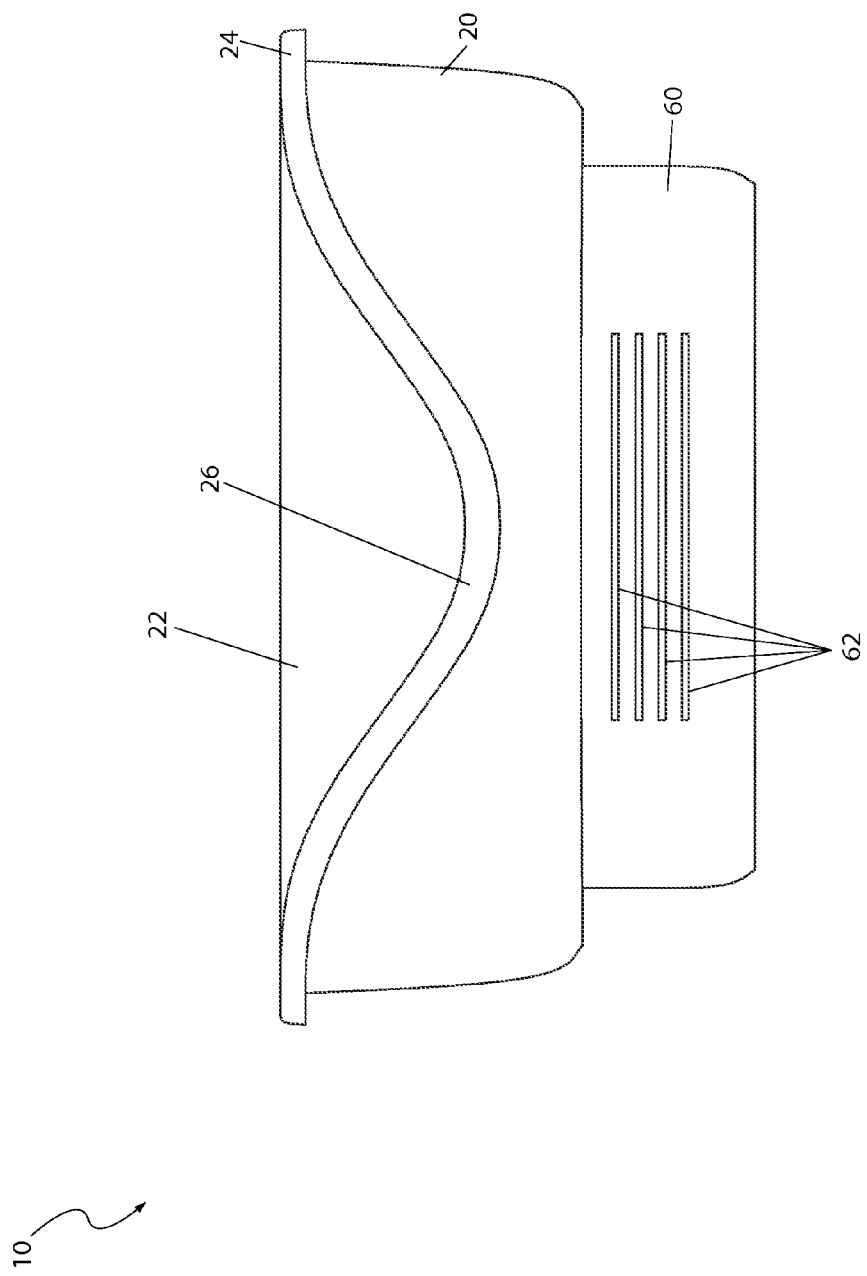

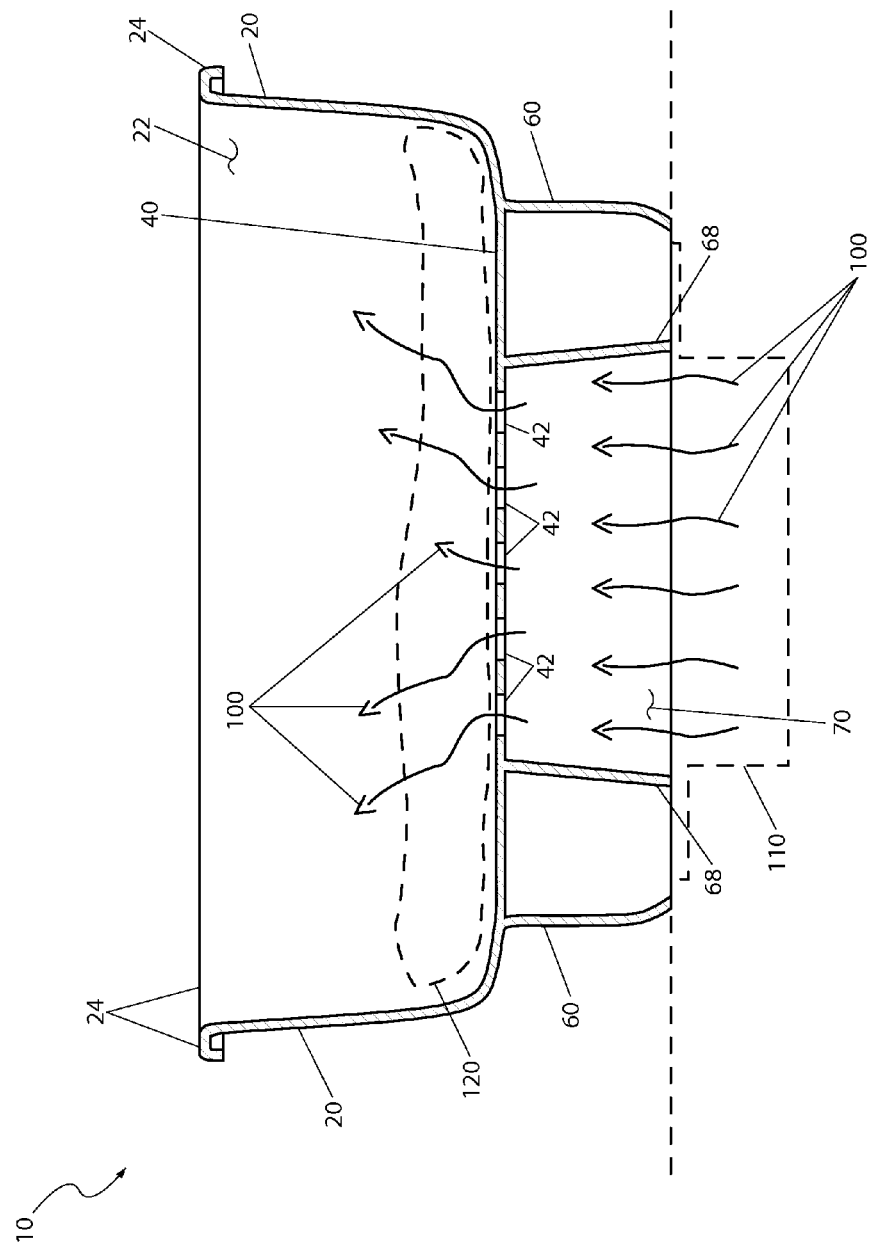

VENTILATED PET BED

RELATED APPLICATIONS

Not Applicable.

FIELD OF THE INVENTION

The present invention relates generally to pet beds, and in particular, to a ventilated pet bed which utilizes a flow of conditioned air from an HVAC floor register to heat or cool a pet sleeping area.

BACKGROUND OF THE INVENTION

Those of us with pets such as dogs know that one of their favorite places to rest or sleep is upon a floor mounted HVAC register. Such registers put out warm air in the wintertime and cool air in the summertime which helps the animal regulate their body temperature as well. This keeps the animal comfortable beyond temperature ranges that would be acceptable to humans.

However, this pet behavior does have several disadvantages. First, the pet is forced to lie upon the floor or vent without any padding or even a blanket which can be very uncomfortable. Second, the vast majority of the air is blocked off, thus affecting temperature in the room which can cause the room occupants to become uncomfortable. Finally, should the pet be large enough or positioned just right, the entire air flow can become blocked. When this occurs, the pet receives no temperature relief as well as the room occupants.

SUMMARY OF THE INVENTION

The inventor has recognized the aforementioned inherent problems and lack in the art and observed that there is a need for a pet bed in which pets, such as dogs, can be afforded temperature relief from floor mounted HVAC registers without the disadvantages described above.

Accordingly, it is an object of the present embodiments of the invention to solve at least one of these problems. The inventor has addressed this need by developing a ventilating pet bed that allows dog owners to provide their dogs with a bed that is comfortable and temperature controlled. The inventor has thus realized the advantages and benefits of providing a bed structure having a floor, upwardly extending walls terminating at an upper edge, and an entrance feature defining an upper cavity for surrounding a pet. A base structure is provided having downwardly extending walls defining a lower cavity. The base structure supports the bed structure above and parallel to an HVAC floor register. A plurality of first ventilating slots is provided and disposed through the bed structure floor. A plurality of second ventilating slots is provided and disposed through a front wall of the base structure.

The lower cavity receives a conditioned air flow from the register. A first portion of the air flow exits the base structure through the first ventilating slots to condition the upper cavity, the pet, and any included bedding material. A second portion of the air flow exits the base structure through the second ventilating slots to condition a room area.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 2a is a front view of the ventilated pet bed;
FIG. 3b is a bottom view of the ventilated pet bed; and,
FIG. 4 is a section view of the ventilated pet bed taken along section line A-A of FIG. 3a.

Figure 1:
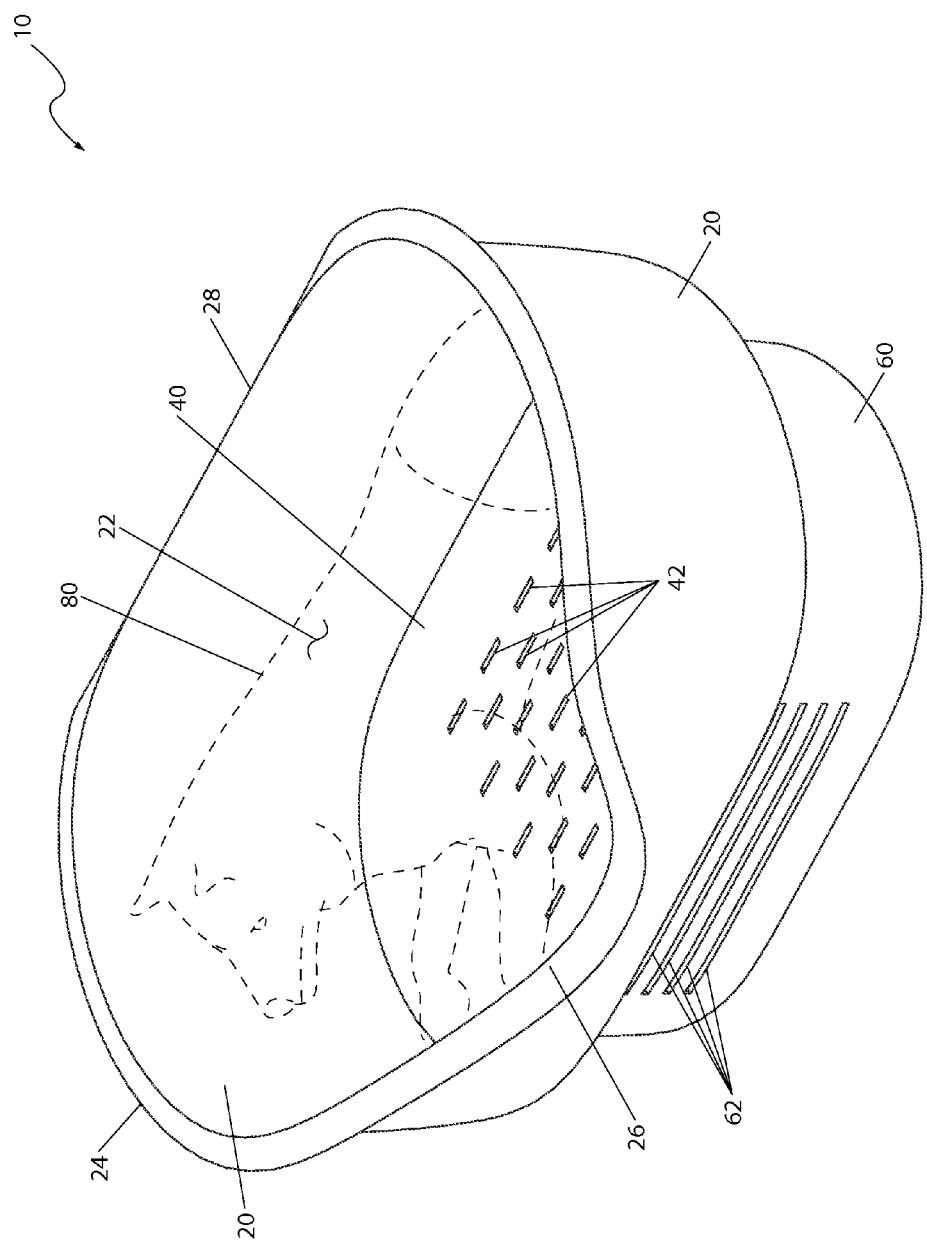
FIG. 1 is a front perspective view of a ventilated pet bed in accordance with the invention.
Figure 2B:
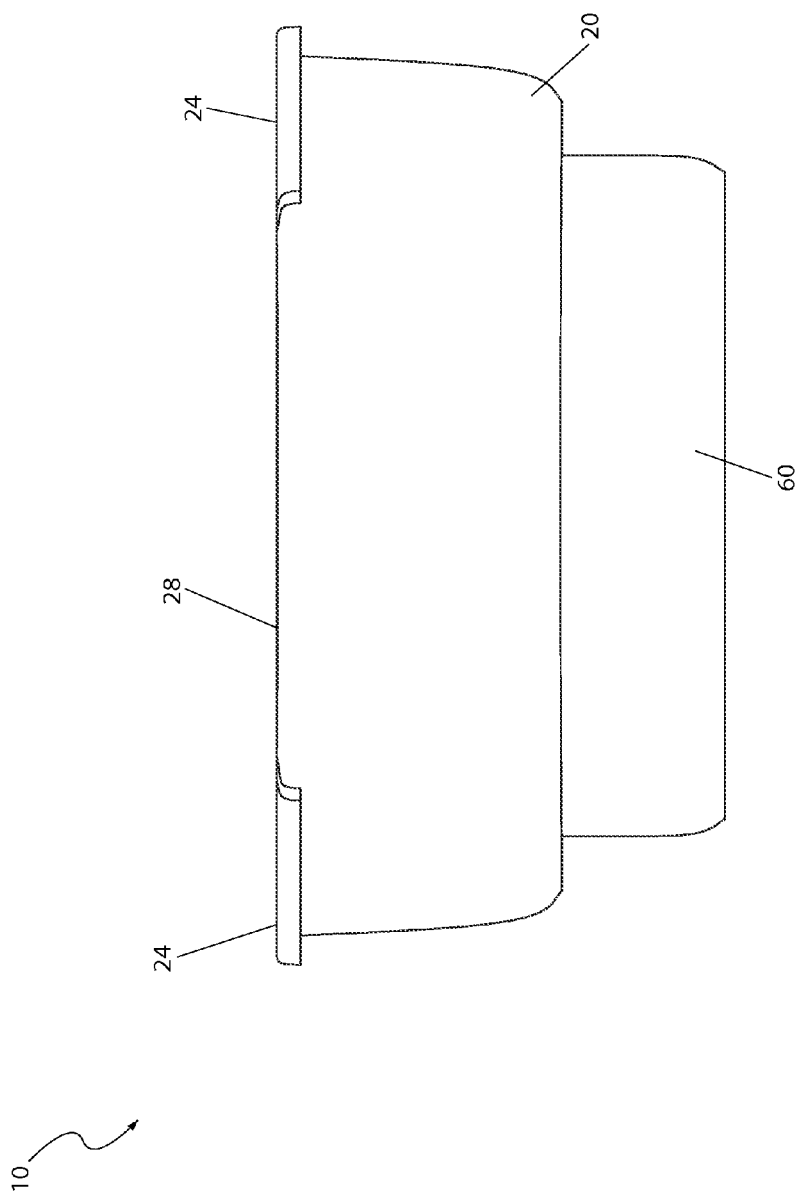
FIG. 2b is a rear view of the ventilated pet bed.

| DESCRIPTIVE KEY | |
|---|---|
| 10 | ventilated pet bed |
| 20 | bed structure |
| 22 | upper cavity |
| 24 | rim |
| 26 | entrance feature |
| 28 | wall relief feature |
| 40 | floor |
| 42 | first ventilating slot |
| 60 | base structure |
| 62 | second ventilating slot |
| 68 | inner walls |
| 70 | lower cavity |
| 80 | pet |
| 100 | air flow |
| 110 | register |
| 120 | bedding material |

DETAILED DESCRIPTION OF THE PREFERRED EMBODIMENT

In accordance with the invention, the best mode is presented in terms of a preferred embodiment, herein depicted within FIGS. 1 through 4. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

Referring now to FIGS. 1 through 4, depicting a ventilated pet bed (herein described as the "device") 10, where like reference numerals represent similar or like parts. In accordance with the invention, the present disclosure describes a pet bed that is designed to sit atop a floor mounted HVAC register 110.

FIG. 1 shows a front perspective view of the device 10. The device 10 is a generally oval or kidney-shaped unit approximately fourteen (14) inches tall and twenty (20) inches wide. It can be appreciated that the device 10 can include various dimensions based upon a particularly sized pet 80 which is anticipated to occupy the device 10 and as such should not be interpreted as a limiting factor of the invention. Additionally, the device 10 can be molded in a variety of attractive colors and patterns to match an existing décor.

The device 10 is a one-piece molded plastic construction having a downwardly-tapering bed structure 20 and a subjacent cylindrical base structure 60. The base structure 60 is a hollow open-bottomed platform approximately five (5) inches in height which sets upon and covers over a floor-mounted HVAC register 110. The register 100 provides a hot or cold air flow 100 which enters the base structure 60 from below and subsequently exits the base structure 60 through a plurality of integral first ventilating slots 42 and a plurality of second ventilating slot 62. The first ventilating slots 42 are through holes arranged along a top surface of the base structure 60. The first ventilating slots 42 provide an upward air flow 100 into the interior area of the bed structure 20 to warm or cool the pet 80. The second ventilating slots 62 are through holes arranged along a front surface of the base structure 60. The remaining air flow 100 exits through the second ventilating slots 62 to continue to heat or cool the surrounding room.

These features allow a room to be heated or cooled in a normal manner while the occupying pet 80 within the device 10 is kept warm or cool by the shared conditioned air flow 100. The device 10 allows pet owners to provide their pets 80 with a bed that is comfortable and also provides temperature modulation.

FIGS. 2a, 2b, 3a, and 3b respectively show a front, a rear, a top, and a bottom view of the device 10. The bed structure 20 is integral to and supported by the slightly indented base structure 60. The bed structure 20 also includes an integral down-turned rim 24 along an upper perimeter edge which provides comfort and safety to the pet 80. The front side of the bed structure 20 and the rim 24 have a forwardly-facing entrance feature 26. The entrance feature 26 is a downwardly curved open area of the bed structure 20 that provides a lowered front wall over which the pet 80 can step allowing easy access in and out of the bed structure 20. The device 10 also includes a wall relief feature 28 along a rear upper edge of the bed structure 20 and a rearward-most portion of the rim portion to allow the device 10 to be flushly abutted against an adjacent wall structure to minimize a distance which the device 10 protrudes outwardly into a room area.

The second ventilating slots 62 are a plurality of long narrow openings approximately one-eighth (⅛) to one-quarter (¼) of an inch wide arranged in an equally-spaced and parallel manner extending horizontally across a front surface of the base structure 60.

The first ventilating slots 42 are a plurality of parallel rows of equally-spaced upward-facing oval-shaped openings approximately one-eighth (⅛) of an inch wide being formed through the top surface of the base structure 60. Various types and styles of bedding materials 120 can be placed on the floor 40 within the bed structure 20 to provide additional comfort to the pet 80.

Figure 3A:
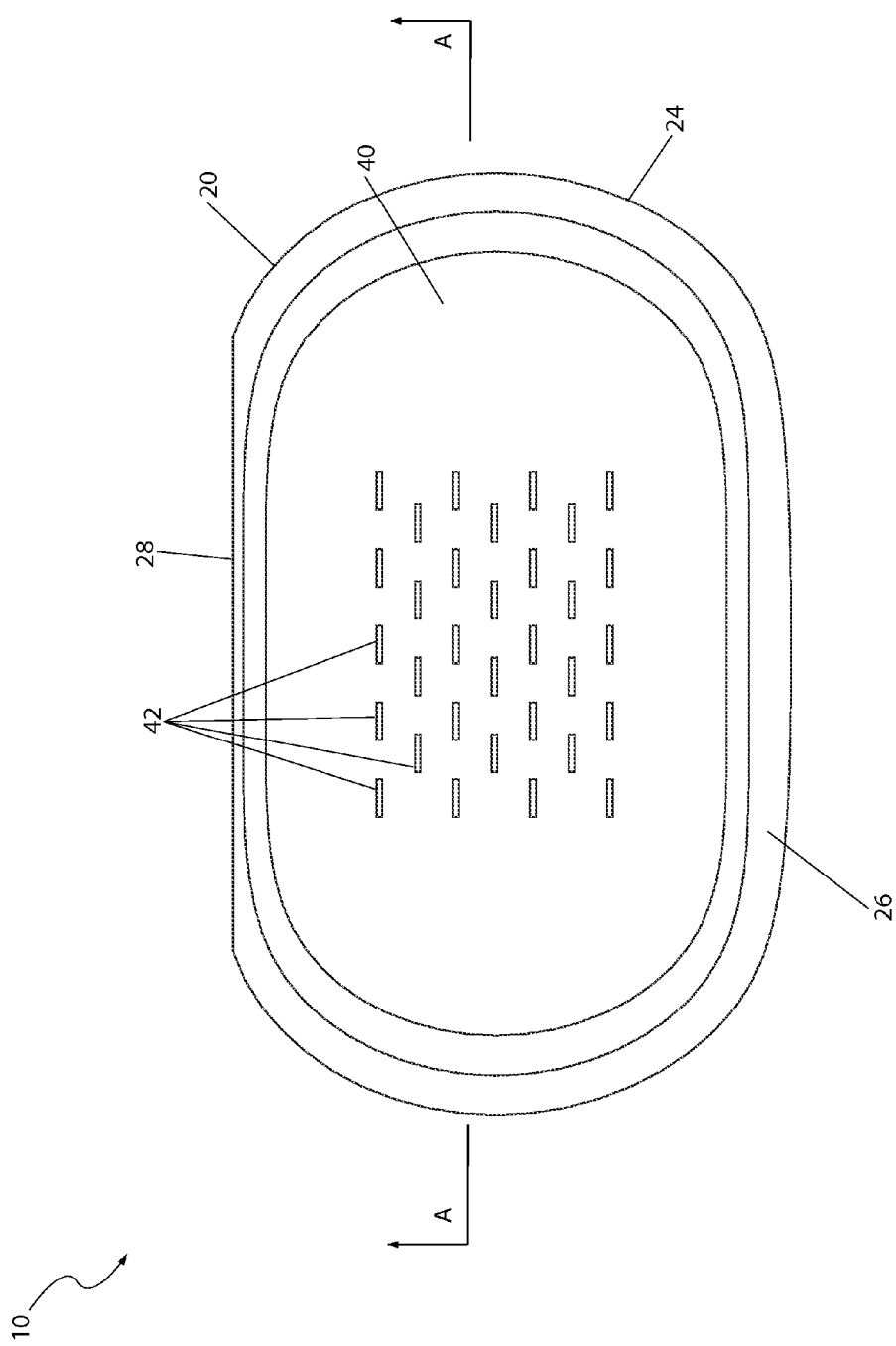
FIG. 3a is a top view of the ventilated pet bed.
Figure 3B:
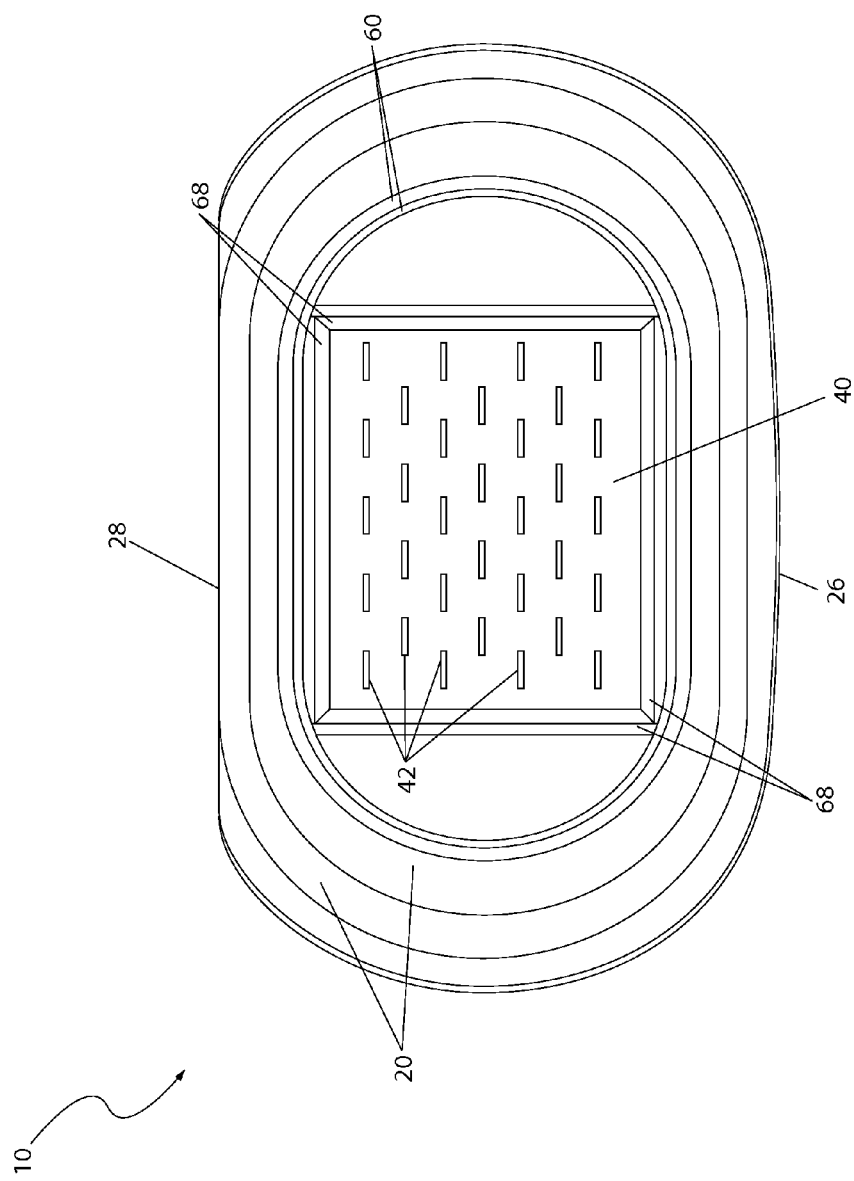

FIG. 4 shows a section view of the device taken along section line A-A of FIG. 3a and more clearly shows the structural configuration of the device 10. The top surface of the base structure is coincidentally the flat floor 40 of the bed structure 20. The floor 40 supports an occupying pet 80 and separates an open upper cavity 22 of the bed structure 20 from a lower open cavity 70 of the base structure 60. Additionally, the base structure 60 includes a pair of parallel inner walls 68 extending traversly across a bottom of said floor 40. The inner walls 68 provide additional structural integrity to the base structure 60 in cases where the air flow 100 is heated, which can potentially weaken the integrity of the outer walls of the base structure 60.

It can be appreciated by one skilled in the art that other styles and configurations of the invention can be easily incorporated into the teachings of the present disclosure and only one particular configuration has been shown and described for purposes of clarity and disclosure and not by way of limitation of scope.

In accordance with the invention, the preferred embodiment can be utilized by the user in a simple and effortless manner with little or no training. After initial purchase or acquisition of the device 10, it is installed and utilized as indicated in FIGS. 1 through 4.

The method of installing and utilizing the device 10 can be achieved by performing a series of steps. It can be appreciated that the steps described can be performed in alternative order and as such should not be viewed as a limiting factor. Procuring a model and size of the device 10 suitable to a particular anticipated occupying pet 80. Placing the base structure 60 of the device 10 over a floor HVAC register 110. Positioning the wall relief feature 28 against an adjacent wall surface to minimize the distance the device 10 extends into a room. Allowing the pet 80 to occupy the bed structure 20 in a conventional manner and be warmed or cooled by the air flow 100. Benefiting from a pet bed which provides improved thermal comfort during use.

A user can also choose to add desired pet bedding materials 120 to the bed structure 20 to enhance the comfort of the pet 80.

The foregoing descriptions of specific embodiments have been presented for purposes of illustration and description. They are not intended to be exhaustive or to limit the invention and method of use to the precise forms disclosed. Various modifications and variations can be appreciated by one skilled in the art in light of the above teachings. The embodiments have been chosen and described in order to best explain the principles and practical application in accordance with the invention to enable those skilled in the art to best utilize the various embodiments with expected modifications as are suited to the particular use contemplated. It is understood that various omissions or substitutions of equivalents are contemplated as circumstance may suggest or render expedient, but is intended to cover the application or implementation without departing from the spirit or scope of the claims of the invention.

What is claimed is:

1. A ventilated pet bed comprising:
   a bed structure comprising a floor and upwardly extending walls terminating at an upper edge defining an upper cavity;
   a base structure comprising a downwardly extending continuous sidewall comprising an upper end and an opposed lower end, said sidewall defining an interior volume, said base structure for supporting said bed structure above and parallel to a source of forced air;
   a pair of inner walls extending downwardly from a bottom of said floor within said interior volume, said inner walls comprising upper ends and opposed lower ends horizontally aligned with said lower end of said sidewall, said inner walls traverse said bottom of said floor between opposed locations on an interior of said sidewall defining a lower cavity being substantially open at its lower end;
   a plurality of first ventilating slots disposed through a portion of said floor between said inner walls; and, a plurality of second ventilating slots disposed through a portion of said sidewall between said inner walls;

wherein an air flow from said source of forced air enters said lower cavity and a first portion of said air flow exits through said first ventilating slots and a second portion of said air flow exits through said second ventilating slots.

2. The pet bed of claim 1, wherein said bed structure walls upper edge further comprises a downwardly extending rim.

3. The pet bed of claim 1, wherein said inner walls are substantially parallel to said sidewall.

4. The pet bed of claim 1, wherein said bed structure further comprises an entrance feature defining an opening for ingress and egress for a pet to said upper cavity.

5. The pet bed of claim 1, wherein said bed structure walls further comprise an outwardly extending angle from said floor.

6. The pet bed of claim 1, wherein said bed structure further comprises a wall relief feature defining a planar surface for abutting an adjacent wall surface.

7. The pet bed of claim 1, wherein said bed structure further comprises a generally oval shape.

8. The pet bed of claim 1, wherein each of said plurality of second ventilating slots further comprises an oval opening approximately between one-eighth and one-quarter inches long.

9. The pet bed of claim 1, wherein each of said plurality of first ventilating slots further comprises an oval opening approximately one-eighth inch long.

10. A ventilated pet bed comprising:
a bed structure comprising a floor, upwardly extending walls terminating at an upper edge defining an upper cavity for surrounding a pet, said bed structure comprising an entrance feature disposed at a front portion of said walls and a relief feature disposed at a rear portion of said walls opposite said entrance feature;
a base structure comprising a downwardly extending continuous sidewall comprising an upper end and an opposed lower end, said sidewall defining an interior volume, said base structure for supporting said bed structure above and parallel to an source of forced air;
a pair of inner walls extending downwardly from a bottom of said floor within said interior volume, said inner walls comprising upper ends and opposed lower ends horizontally aligned with said lower end of said sidewall, said inner walls traverse said bottom of said floor between opposed locations on an interior of said sidewall defining a lower cavity being substantially open at its lower end;
a plurality of first ventilating slots disposed through a portion of said floor between said inner walls; and,
a plurality of second ventilating slots disposed through a front portion of said of said sidewall between said inner walls;
wherein said lower cavity receives a conditioned air flow from said source of forced air;
wherein a first portion of said air flow exits said lower cavity through said first ventilating slots to condition said upper cavity; and,
wherein a second portion of said air flow exits said lower cavity through said second ventilating slots to condition a room area.

11. The pet bed of claim 10, wherein said entrance feature further defines an opening for ingress and egress for a pet to said upper cavity.

12. The pet bed of claim 11, wherein said relief feature defines a planar surface for abutting an adjacent wall surface.

13. The pet bed of claim 12, wherein said inner walls are substantially parallel to said sidewall.

14. The pet bed of claim 13, wherein said bed structure walls further comprise an outwardly extending angle from said floor.

15. The pet bed of claim 14, wherein said bed structure walls upper edge further comprises a downwardly extending rim.

16. The pet bed of claim 15, wherein said bed structure further comprises a generally oval shape.

17. The pet bed of claim 16, wherein each of said plurality of first ventilating slots further comprises an oval opening approximately one-eighth inch long.

18. The pet bed of claim 17, wherein each of said plurality of second ventilating slots further comprises an oval opening approximately between one-eighth and one-quarter inches long.

19. The pet bed of claim 16, wherein each of said plurality of second ventilating slots further comprises an oval opening approximately between one-eighth and one-quarter inches long.

* * * * *